United States Patent
Kawamura et al.

(10) Patent No.: US 9,407,436 B2
(45) Date of Patent: *Aug. 2, 2016

(54) PORTABLE DEVICE REGISTRATION SYSTEM AND PORTABLE DEVICE REGISTRATION METHOD

(71) Applicant: KABUSHIKI KAISHA TOKAI RIKA DENKI SEISAKUSHO, Aichi (JP)

(72) Inventors: Daisuke Kawamura, Aichi (JP); Hideki Kawai, Aichi (JP); Tetsuya Egawa, Aichi (JP); Hiroaki Iwashita, Aichi (JP); Toshihiro Nagae, Aichi (JP); Takeo Endo, Nagoya (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/370,909

(22) PCT Filed: Jan. 18, 2013

(86) PCT No.: PCT/JP2013/050917
§ 371 (c)(1),
(2) Date: Jul. 7, 2014

(87) PCT Pub. No.: WO2013/114973
PCT Pub. Date: Aug. 8, 2013

(65) Prior Publication Data
US 2015/0003613 A1 Jan. 1, 2015

(30) Foreign Application Priority Data
Jan. 31, 2012 (JP) ................. 2012-018584

(51) Int. Cl.
*H04L 29/00* (2006.01)
*H04L 9/08* (2006.01)
(Continued)

(52) U.S. Cl.
CPC .............. *H04L 9/0869* (2013.01); *B60R 25/24* (2013.01); *H04L 9/0819* (2013.01);
(Continued)

(58) Field of Classification Search
CPC ... H04L 9/0861; H04L 9/3271; H04L 9/0869; H04L 9/0819; H04L 2209/80; H04L 2209/84; H04L 2209/24; H04W 12/04; H04W 12/06; B60R 25/24
USPC ............................................ 726/26; 380/278
See application file for complete search history.

(56) References Cited

U.S. PATENT DOCUMENTS 5,886,421 A 3/1999 Mizuno et al.
2004/0046452 A1* 3/2004 Suyama et al. .............. 307/10.2
(Continued)

FOREIGN PATENT DOCUMENTS

EP 0801192 10/1997
JP 2001-323704 11/2001
(Continued)

OTHER PUBLICATIONS

Search report from Japan, mail date is Mar. 5, 2013.
(Continued)

*Primary Examiner* — Don Zhao
(74) *Attorney, Agent, or Firm* — Greenblum & Bernstein, P.L.C.

(57) ABSTRACT

An immobilizer ECU generates an encryption key using key generating logic, from a SEED code included in an ID code signal sent from an electronic key, and registers the encryption key to the immobilizer ECU. The immobilizer ECU receives an instruction from a registration and deletion tool and sends, to the electronic key, a deletion request signal that requests the deletion of the SEED code. The electronic key deletes the SEED code from the electronic key if a deletion request signal has been received.

9 Claims, 4 Drawing Sheets

(51) Int. Cl.
*H04L 9/32* (2006.01)
*H04W 12/04* (2009.01)
*B60R 25/24* (2013.01)
*H04W 12/06* (2009.01)

(52) U.S. Cl.
CPC ........... *H04L 9/0861* (2013.01); *H04L 9/3271* (2013.01); *H04W 12/04* (2013.01); *H04L 2209/24* (2013.01); *H04L 2209/80* (2013.01); *H04L 2209/84* (2013.01); *H04W 12/06* (2013.01)

(56) References Cited

U.S. PATENT DOCUMENTS

| | | | | |
|---|---|---|---|---|
| 2004/0066273 | A1* | 4/2004 | Cortina et al. | 340/5.1 |
| 2006/0066150 | A1* | 3/2006 | Kiuchi et al. | 307/10.3 |
| 2007/0200660 | A1* | 8/2007 | Endo et al. | 340/5.22 |
| 2008/0255721 | A1* | 10/2008 | Yamada | 701/33 |
| 2009/0278656 | A1* | 11/2009 | Lopez et al. | 340/5.72 |
| 2010/0220857 | A1* | 9/2010 | Kawamura et al. | 380/44 |
| 2011/0173447 | A1* | 7/2011 | Zhang | 713/168 |

FOREIGN PATENT DOCUMENTS

| | | |
|---|---|---|
| JP | 2006-021597 | 1/2006 |
| JP | 2009-271936 | 11/2009 |
| JP | 2009-302848 | 12/2009 |
| JP | 2010-206383 | 9/2010 |

OTHER PUBLICATIONS

International Preliminary Report on Patentability (IPRP) for PCT/JP2013/050917, mail date is Aug. 5, 2014 (English translation).

Written Opinion for PCT/JP2013/050917, mail date is Mar. 5, 2013 (English translation).

Search Report issued by E.P.O. patent office in E.P.O. Patent Application No. 13743400.7, dated Sep. 16, 2015.

* cited by examiner

Fig.5

<Manufacturing Operation of Additional Key>

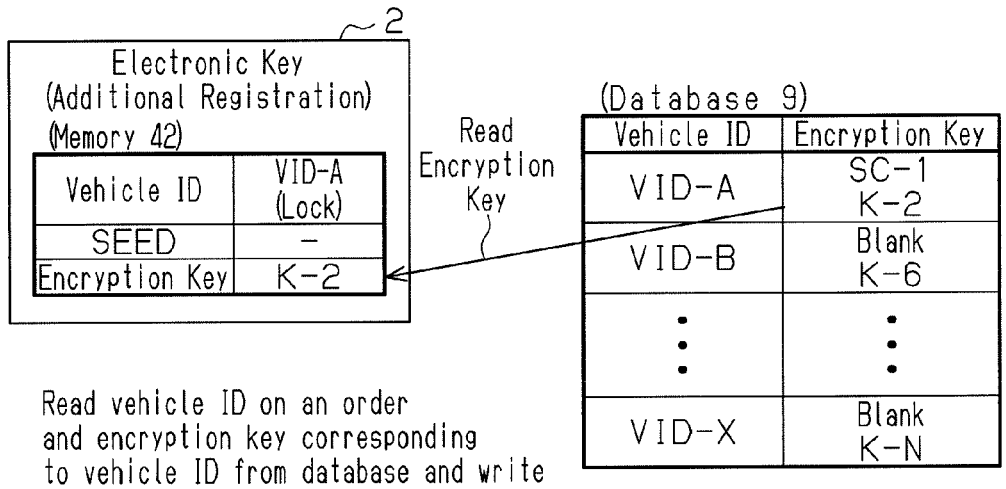

Read vehicle ID on an order
and encryption key corresponding
to vehicle ID from database and write

Fig.6

<Manufacturing Operation of Replacement ECU>

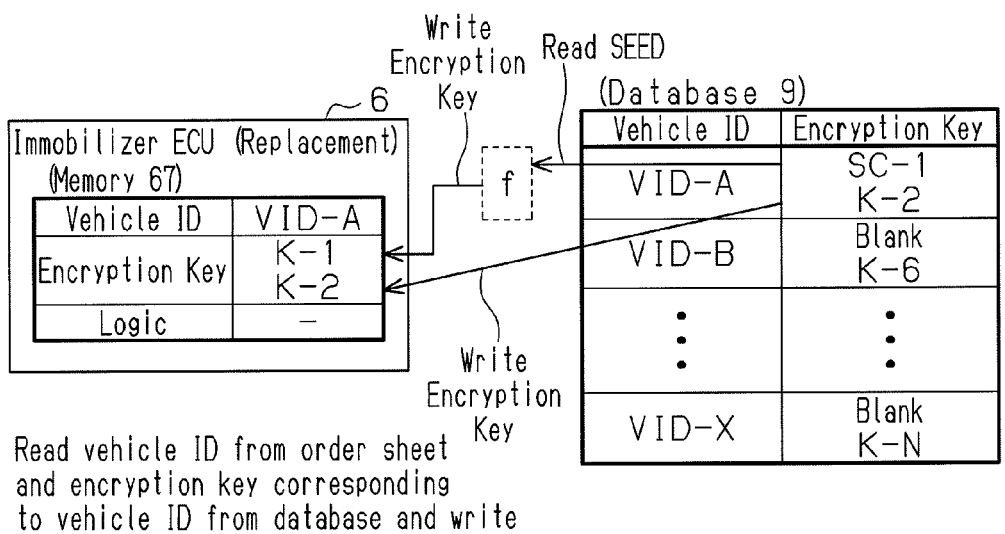

Read vehicle ID from order sheet
and encryption key corresponding
to vehicle ID from database and write Regarding SEED code,
generate encryption key by using key
generation logic f and write

PORTABLE DEVICE REGISTRATION SYSTEM AND PORTABLE DEVICE REGISTRATION METHOD

TECHNICAL FIELD

The present invention relates to a system and a method for registering a portable device to a controller of a communication subject.

BACKGROUND ART

A conventional portable device system performs encrypted communication between a vehicle and a portable device, which a user of the vehicle carries, and permits or performs locking or unlocking of a vehicle door and the starting or stopping of the engine when the verification is successful. The communication between the portable device and the vehicle is encrypted and protected (for example, refer to Patent Document 1).

As the above encrypted communication, the common key cryptosystem that uses the same encryption key for encryption and decryption is known. A common encryption key, that is, the same encryption key is registered to a portable device and a vehicle, which perform encrypted communication using the common key cryptosystem. The encryption key is registered to the portable device and the vehicle when registering the portable device to a controller of the vehicle. The controller verifies the portable device by verifying identification information that is received through wireless communication from the portable device with identification information that is stored in the controller.

PRIOR ART DOCUMENT

Patent Document

Patent Document 1: Japanese Laid-Open Patent Publication No. 2009-302848

SUMMARY OF THE INVENTION

In a portable device registration system that registers a portable device to a controller, to avoid registration of a portable device other than that of user, the inventors of the present application has contemplated shipping the portable device and the controller out of the factory after storing a vehicle ID (unique identification information of a communication subject) of a vehicle (communication subject) to the controller and the portable device. However, the inventors of the present application have noticed that it is possible for a third party to read the unique identification information of the communication subject from the shipped authentic portable device to manufacture a duplicate, or an unauthentic portable device that stores the same identification information as that of the authorized portable device.

It is an object of the present invention to provide a portable device registration system and a portable device registration method that obtain a high level of security after shipment from the factory.

One aspect of the present invention provides a portable device registration system that includes a portable device that performs encrypted communication with a communication subject using the same encryption key, and a controller that is included in the communication subject, and registers the portable device to the controller. The controller stores identification information unique to the communication subject and a key generation logic used to generate the encryption key. The portable device stores an encryption key generation code unique to the portable device and the encryption key, which is generated from the encryption key generation code and the key generation logic. The controller performs a registration process including, writing the identification information to the portable device through wireless communication with the portable device, retrieving the encryption key generation code from the portable device through wireless communication with the portable device, generating an encryption key that is the same as that of the portable device from the retrieved the encryption key generation code using the key generation logic stored in the controller, and storing the generated encryption key in the controller. The portable device registration system includes a deletion tool, which instructs the controller to transmit a deletion request signal to the portable device to delete the encryption key generation code from the portable device. The controller transmits the deletion request signal to the portable device after receiving an instruction from the deletion tool, and the portable device deletes the encryption key generation code from the portable device when receiving the deletion request signal.

This structure allows for the encryption key generation code to be deleted at any time. For example, the encryption key generation code may be deleted after the portable device is registered to the controller and prior to shipment of the portable device. An encryption key, which is required for verification for encrypted communication between the portable device and the controller, is generated from the encryption key generation code. However, a portable device storing the encryption key generation code is never shipped out of the factory. Thus, even when leakage of the encryption key generation logic occurs, it is difficult to manufacture an unauthentic duplicate of the portable device using information stored in the portable device.

In one example, the deletion tool transmits a registration instruction to instruct starting of the registration process, and the controller performs the registration process when receiving the registration instruction.

One example of the portable device registration system includes a database that saves the identification information, which is stored in the controller prior to shipment, in association with a registration encryption key or an encryption key generation code, and further includes a supplemental portable device and a supplemental controller that store the identification information, which is saved in the database, and an encryption key, which is generated from the registration encryption key or the encryption key generation code saved in the database.

In one example, the controller deletes the key generation logic from the controller after the encryption key is generated.

In one example, the encryption key generation code is deleted from the portable device in a final inspection of the communication subject.

In one example, the portable device includes a portable device memory that stores the encryption key generation code only during a period from when the portable device is manufactured to when the portable device is shipped out from a factory.

In one example, the controller does not include the encryption key that is stored in the portable device prior to registration of the portable device but includes the encryption key after registration of the portable device.

Another aspect of the present invention provides a portable device registration method for registering a portable device to a controller installed in a vehicle where the portable device performs encrypted communication with the vehicle using the same encryption key. The method includes storing identification information unique to the vehicle and a key generation logic used to generate the encryption key in the controller and storing an encryption key generation code unique to the portable device and the encryption key generated from the encryption key generation code and the key generation logic in the portable device. The method further includes, after the controller is installed in the vehicle, performing a registration process, in which the controller writes the identification information to the portable device through wireless communication with the portable device, retrieves the encryption key generation code from the portable device through wireless communication with the portable device, generates an encryption key that is the same as that of the portable device from the retrieved key generation code using the key generation logic stored in the controller, and stores the generated encryption key in the controller. The method further includes, during an inspection conducted on the vehicle after the controller stores the encryption key, instructing the controller to transmit a deletion request signal to the portable device to delete the encryption key generation code from the portable device, transmitting the deletion request signal to the portable device from the controller upon receipt of the instruction, and deleting the encryption key generation code from the portable device when the portable device receives the deletion request signal.

BRIEF DESCRIPTION OF THE DRAWING

FIG. 5 is a schematic diagram showing production of an additional key for the portable device registration system.

FIG. 6 is a schematic diagram showing production of a replacement ECU for the portable device registration system.

EMBODIMENTS OF THE INVENTION

A portable device registration system according to one embodiment of the present invention will now be described below.

Figure 1:
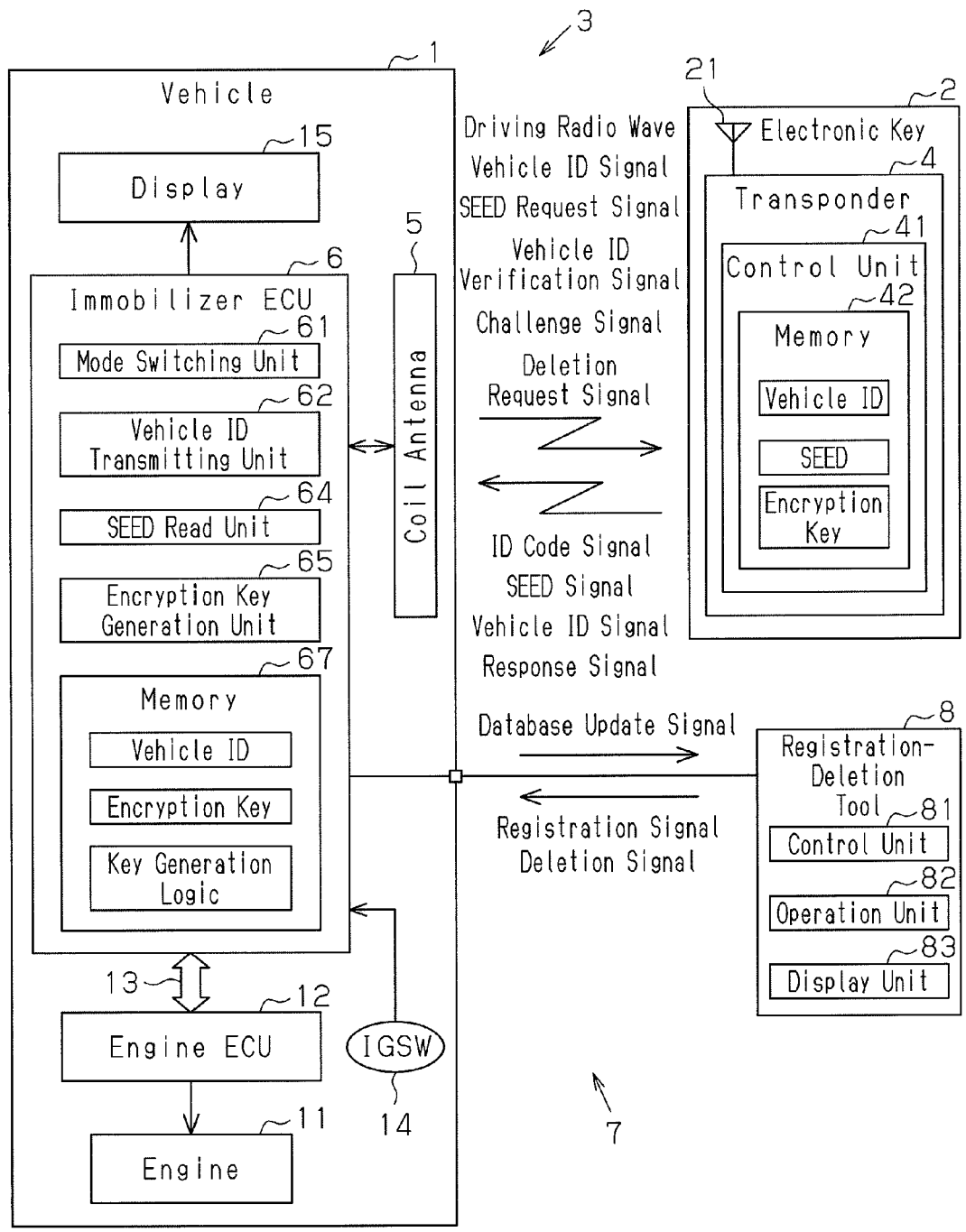
FIG. 1 is a block diagram of the portable device registration system.

As shown in FIG. 1, a vehicle 1 includes an immobilizer system 3 that performs ID verification with an electronic key 2 through, for example, near field communication (wireless communication of which the communication distance is approximately a few centimeters). The electronic key 2 includes a transponder 4, which can be an ID tag. The transponder 4 is activated by a driving radio wave, which is transmitted from a coil antenna 5 of the vehicle 1, and transmits an ID code signal. The immobilizer system 3 includes an immobilizer ECU 6, which is arranged in the vehicle 1. The immobilizer ECU 6 performs ID verification based on the ID code signal, which is transmitted from the transponder 4. The vehicle 1 is one example of a communication subject. The immobilizer system 3 is one example of an electronic key system. The immobilizer ECU 6 is one example of a controller.

An engine ECU 12, which controls an engine 11, is connected to the immobilizer ECU 6 through an in-vehicle LAN 13. An ID code of the electronic key 2, which is paired with the vehicle 1, is registered to a memory 67 of the immobilizer ECU 6. The coil antenna 5, which receives and transmits radio waves in the low frequency (LF) bandwidth and radio waves in the high frequency (HF) bandwidth, is connected to the immobilizer ECU 6. In a preferred example, the coil antenna 5 is a magnetic field antenna and arranged in a key cylinder.

The transponder 4 includes a control unit 41, which controls communication operations of the electronic key 2. A unique ID code (transponder code) of the electronic key 2 is registered to a memory 42 of the control unit 41. The transponder 4 includes an antenna 21, which receives and transmits radio waves in the LF bandwidth and radio waves in the HF bandwidth.

The immobilizer ECU 6 intermittently transmits the driving radio wave from the coil antenna 5 when detecting insertion of the electronic key 2 into the key cylinder. For example, a user enters the vehicle and inserts the electronic key 2 into the key cylinder and operates the key cylinder to start the engine 11. Then, the transponder 4 receives, with a transmitting-receiving antenna 21, the driving radio wave, which is transmitted from the coil antenna 5. This activates the transponder 4 using the driving radio wave as a power supply. The activated transponder 4 transmits, from the transmitting-receiving antenna 21, an ID code signal that includes the ID code, which is registered to the transponder 4. When the immobilizer ECU 6 receives, with the coil antenna 5, the ID code signal, which is transmitted from the transponder 4, the immobilizer ECU 6 performs ID verification (immobilizer verification) on the ID code, which is included in the received ID code signal. The immobilizer ECU 6 stores the result of ID verification in the memory 67.

The key cylinder includes an ignition switch (IGSW) 14, which detects the rotation position of the electronic key 2. When the ignition switch detects that the electronic key 2 has been moved to the engine-starting position, the engine ECU 12 obtains the ID verification result from the immobilizer ECU 6. If the result indicates verification accomplishment, the engine ECU 12 initiates ignition control and fuel injection control and starts the engine 11.

In addition to verification of the ID code of the electronic key 2, the immobilizer ECU 6 performs challenge response verification. The challenge response verification is performed as follows. First, a challenge code, which is, for example, a random number code, is transmitted from the vehicle 1 to the electronic key 2. The electronic key 2 calculates a response code and sends the response code back to the vehicle 1. The immobilizer ECU 6 of the vehicle 1 determines whether or not a response code calculated by the immobilizer ECU 6 is the same as the response code received from the electronic key 2 and verifies the electronic key 2 when the two codes are the same. In the illustrated example, the common key cryptosystem, which uses a common encryption key, is employed for verification between the immobilizer ECU 6 and the transponder 4. The electronic key 2 and the immobilizer ECU 6 store a common encryption key. The electronic key 2 and the immobilizer ECU 6 use the common encryption key to calculate the response code from the challenge code.

A vehicle ID (VID) that is unique identification information of the vehicle 1, a SEED code (SC) that is used for generation of an encryption key K, and the encryption key K that is used for verification are stored in the memory 42 of the transponder 4. The SEED code is also referred to as the encryption key generation code.

A vehicle ID (VID) that is unique identification information of the vehicle 1, an encryption key K that is used for verification, and a key generation logic f that is like an arithmetic expression and an algorithm and used for generation of the encryption key K are stored in the memory 67 of the immobilizer ECU 6.

Figure 2:
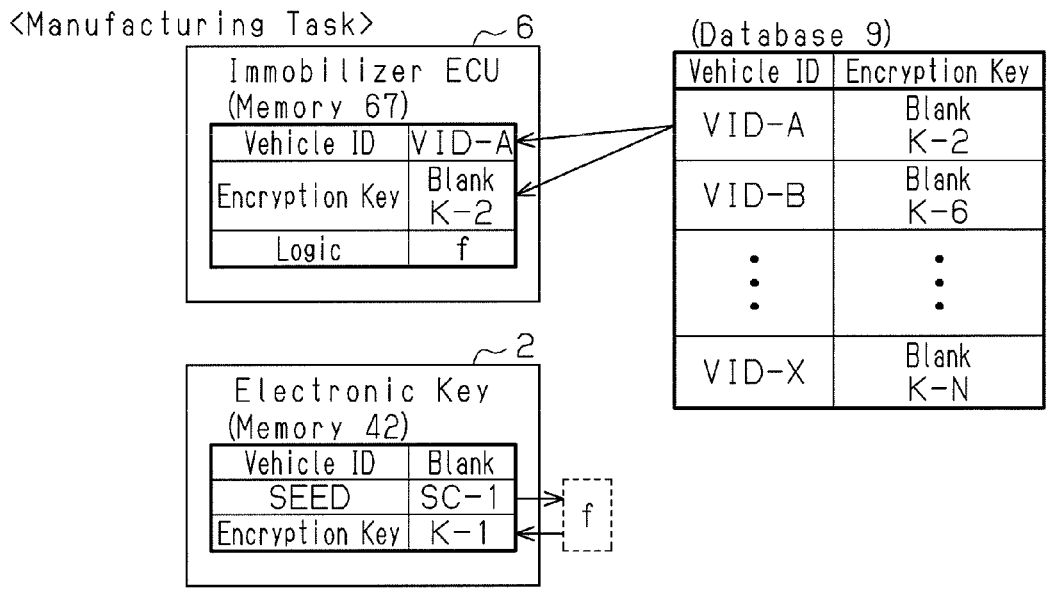
FIG. 2 is a schematic diagram showing production of the portable device registration system.

The immobilizer system 3 includes an electronic key registration system 7, which registers the electronic key 2 to the immobilizer ECU 6. In the electronic key registration system 7, each of the electronic key 2 and the immobilizer ECU 6 registers information that it does not possess but its peer possesses. The electronic key registration system 7 includes a database 9, in which a plurality of encryption keys is stored in association with a single vehicle ID. The database 9 may be located in a component factory for manufacturing the electronic key 2 and the immobilizer ECU 6. As shown in FIG. 2, an encryption key (K-2) corresponding to a vehicle ID (VID-A) that is identification information unique to the vehicle 1 is saved in the database 9. While the immobilizer ECU 6 and the electronic key 2 are manufactured, data that is selectively extracted from the database 9 is stored in the memories 42 and 67.

As shown in FIG. 1, the electronic key registration system 7 includes a registration-deletion tool 8 that registers the electronic key 2 to the immobilizer ECU 6. The registration-deletion tool 8 is connected to the vehicle 1 when used. The registration-deletion tool 8 switches operation modes of the immobilizer ECU 6 between a normal mode and a registration mode. The immobilizer ECU 6 in the registration mode performs wireless communication with the electronic key 2, and provides the electronic key 2 with the unique information of the immobilizer ECU 6, that is, the vehicle ID (VID-A), which is information possessed by the immobilizer ECU 6 but not the electronic key 2. The electronic key 2 registers the unique information of the immobilizer ECU 6. Also, the immobilizer ECU 6 receives, from the electronic key 2, the unique information of the electronic key 2, that is, the encryption key (K-1), which is information possessed by the electronic key 2 but not the immobilizer ECU 6, and registers the unique information of the electronic key 2 to the immobilizer ECU 6 (the memory 67). The registration-deletion tool 8 includes a control unit 81 that controls the registration-deletion tool 8, an operation unit 82 that detects a registration operation performed by an operator in the factory, and a display unit 83 that displays a registration operation. When the registration mode is set by the operator, the registration-deletion tool 8 provides the vehicle 1 with a registration signal (also referred to as the registration instruction) that shifts the immobilizer ECU 6 to the registration mode. When the deletion mode is set by the operator, the registration-deletion tool 8 provides the vehicle 1 with a deletion signal (also called a deletion instruction) that shifts the immobilizer ECU 6 to the deletion mode.

The registration-deletion tool 8 updates the database 9 through a network, which is not shown in the drawings, when receiving a database update signal (also referred to as the update instruction) from the immobilizer ECU 6.

The immobilizer ECU 6 includes a mode switching unit 61, which switches operation modes of the immobilizer ECU 6. The mode switching unit 61 switches the immobilizer ECU 6 from the normal mode to the registration mode when the registration signal is provided from the registration-deletion tool 8. When the immobilizer ECU 6 is disconnected from the registration-deletion tool 8 after being switched to the registration mode, the mode switching unit 61 switches the immobilizer ECU 6 to the normal mode. The immobilizer ECU 6 in the normal mode performs normal verification, that is, ID verification, with the electronic key 2.

The immobilizer ECU 6 includes a vehicle ID transmitting unit 62, which transmits the vehicle ID, which the immobilizer ECU 6 includes, to the electronic key 2. When the immobilizer ECU 6 is switched to the registration mode, the vehicle ID transmitting unit 62 transmits the vehicle ID signal, which includes the vehicle ID that is stored in the memory 67, from the coil antenna 5 to the electronic key 2.

The immobilizer ECU 6 includes a SEED read unit 64, which reads the SEED code of the electronic key 2 to generate the same encryption key as the encryption key K that is stored in the electronic key 2. For example, the immobilizer ECU 6 transmits a SEED request signal, which requests for a SEED code, from the coil antenna 5. When receiving the SEED request signal, the electronic key 2 generates the SEED signal, which includes the SEED code, and transmits the generated SEED signal. The SEED read unit 64 retrieves the SEED code from the SEED signal, which is received through the coil antenna 5.

The immobilizer ECU 6 includes an encryption key generation unit 65, which generates the encryption key K. The encryption key generation unit 65 generates the encryption key K from the SEED code, which is obtained by the SEED read unit 64, by using the key generation logic f in the memory 67.

Next, an operation for registering the electronic key 2 to the immobilizer ECU 6 will be described with reference to FIGS. 2 to 6.

The vehicle 1, which may be an automobile, includes a wide variety of components. Each component is manufactured in a component factory and sent to an assembly factory and installed in the vehicle 1. For example, the immobilizer ECU 6 and the electronic key 2 are manufactured in the same factory or in different factories. Then, the immobilizer ECU 6 is installed in the vehicle in the assembly factory, and the electronic key 2 is registered to the immobilizer ECU 6.

First, the manufacturing task performed in the component factory prior to the registration operation will be described. As shown in FIG. 2, the key generation logic f is stored in the memory 67 of the immobilizer ECU 6 that is manufactured for initial registration. Additionally, the vehicle ID (VID-A) of the vehicle 1, to which the immobilizer ECU 6 is installed, and the encryption key (K-2) of an additionally registered electronic key 2 are extracted from the database 9 and stored in the memory 67. The SEED code (SC-1) is stored in the memory 42 of the electronic key 2 that is manufactured for initial registration. The SEED code (SC-1) is one example of a unique encryption key generation code of the electronic key 2. The encryption key (K-1), which is generated from the SEED code (SC-1) by using the key generation logic f, is stored in the memory 42. As shown in FIG. 2, at a point of time when the manufacturing operation is completed in the component factory, the encryption key (K-1) is not stored in the immobilizer ECU 6, and the vehicle ID is not stored in the electronic key 2.

Figure 3:
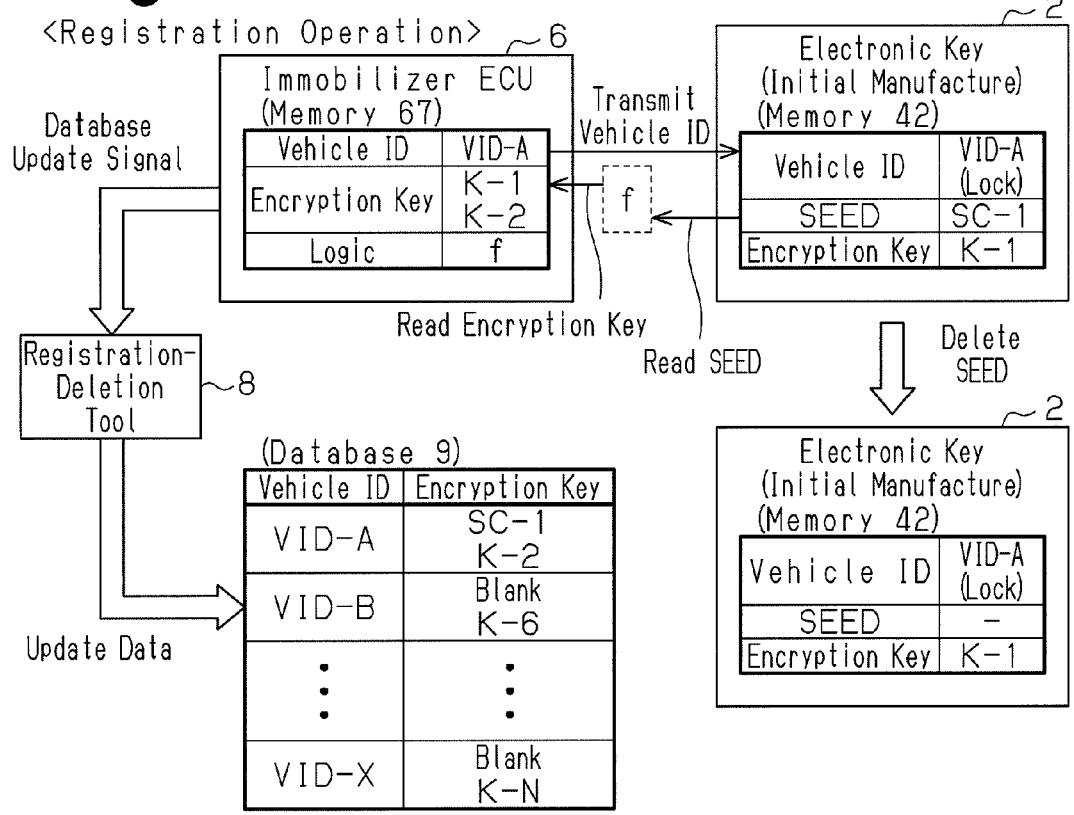
FIG. 3 is a schematic diagram showing registration of the portable device registration system.

Next, the registration operation of the electronic key 2 in the assembly factory will be described. In the example of FIG. 3, first, the immobilizer ECU 6 transmits the vehicle ID signal, which includes the vehicle ID (VID-A). When the electronic key 2 receives the ID code signal from the immobilizer ECU 6, the electronic key 2 registers the vehicle ID included in the vehicle ID signal to the memory 42. Also, the electronic key 2 transmits the SEED code signal, which includes the SEED code (SC-1). The immobilizer ECU 6 temporarily stores the SEED code included in the SEED code signal in the memory 67, generates the encryption key (K-1) from the SEED code by using the key generation logic f, and stores the encryption key (K-1) in the memory 67. The SEED code may be deleted from the memory 67, for example, after updating the database 9, which will be described later.

Figure 4:
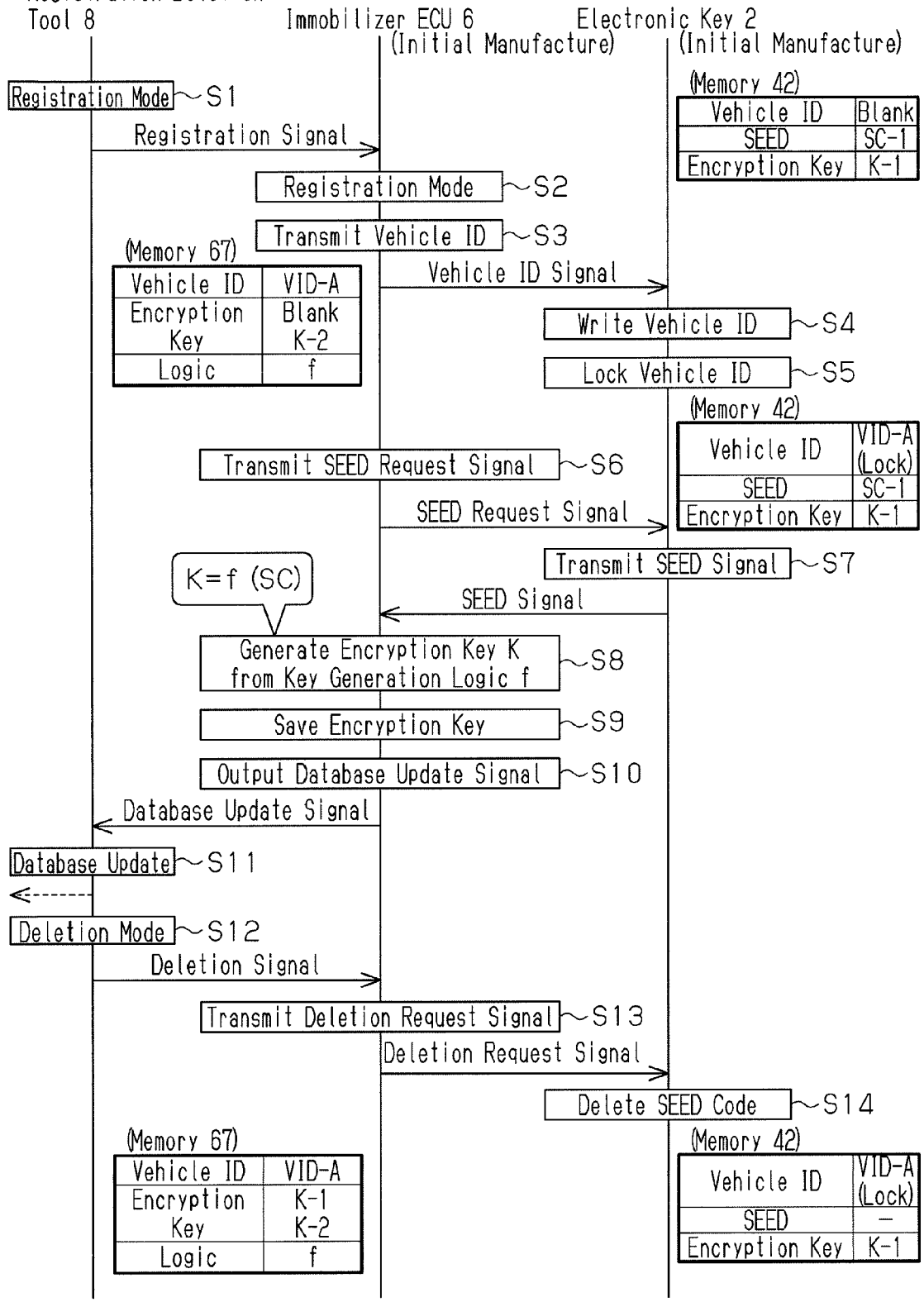
FIG. 4 is a sequence chart showing a registration operation of the portable device registration system.

The registration process of the electronic key 2 will now be described in detail. As shown in FIG. 4, the registration-deletion tool 8 provides the immobilizer ECU 6 with the registration signal when the registration mode is set by the operator (step S1). The immobilizer ECU 6 switches the operation mode to the registration mode when receiving the registration signal (step S2).

Then, the immobilizer ECU 6 transmits the vehicle ID signal, which includes the vehicle ID (VID-A) that is stored in the memory 67, from the coil antenna 5 to the electronic key 2 (step S3).

When the electronic key 2 receives the vehicle ID signal, the electronic key 2 stores the vehicle ID (VID-A) included in the vehicle ID signal in the memory 42 (step S4). In a preferred example, the electronic key 2 locks the vehicle ID (step S5) and prohibits overwriting of the vehicle ID in the memory 42. As a result, the electronic key 2 prevents rewriting of the vehicle ID to the memory 42.

Following the transmission of the vehicle ID in step S3, the immobilizer ECU 6 transmits the SEED request signal, which requests for transmission of the SEED code, from the coil antenna 5 (step S6). In response to the SEED request signal, the electronic key 2 transmits the SEED signal that includes the SEED code (SC-1) stored in the memory 42 (step S7).

The immobilizer ECU 6 generates the encryption key (K-1) from the SEED code (SC-1) in the received SEED signal by using the key generation logic f (step S8). In other words, the immobilizer ECU 6 does not directly obtain the encryption key (K-1) from the electronic key 2, but generates the encryption key (K-1) from the SEED code (SC-1) that is obtained from the electronic key 2. The SEED code (SC-1) is temporarily stored in the memory 67.

Next, the immobilizer ECU 6 stores the generated encryption key (K-1) in the memory 67 (step S9). The use of the registered encryption key (K-1) allows the immobilizer ECU 6 to perform ID verification with the electronic key 2.

Next, the immobilizer ECU 6 provides the registration-deletion tool 8 with the database update signal to update the information of the database 9 (step S10). The database update signal includes the SEED code (SC-1), which is used for generating the encryption key (K-1) corresponding to the vehicle ID (VID-A) stored in the immobilizer ECU 6. The registration-deletion tool 8, after receiving the database update signal, transmits the SEED code (SC-1) in association with the vehicle ID (VID-A) to the database 9 through the network, which is not shown in the drawings, and stores the SEED code in the database 9 (updates database 9) (step S11). As a result, as shown in FIG. 3, the SEED code (SC-1), which serves as information related to the encryption code (K-1) corresponding to the vehicle ID (VID-A), is saved in the database 9. The vehicle ID (VID-A) and the encryption code (K-1) stored in the memory 67 of the immobilizer ECU 6 conform to the vehicle ID (VID-A) and the encryption code (K-1) stored in the memory 42 of the electronic key 2. This allows the immobilizer ECU 6 and the electronic key 2 to perform ID verification. The immobilizer ECU 6 deletes the SEED code from the memory 67 after updating the database 9.

After step S11, the vehicle is completed after processes for coupling vehicle components. Then, a final inspection of the entire vehicle is performed. In the inspection, the registration-deletion tool 8 provides the immobilizer ECU 6 with the deletion signal when the deletion mode is set by the operator (step S12). When the immobilizer ECU 6 receives the deletion signal, the immobilizer ECU 6 transmits a deletion request signal to the electronic key 2 to request for deletion of the SEED code (step S13). When the electronic key 2 receives the deletion signal, the electronic key 2 deletes the SEED code from the memory 42 of the electronic key 2. Consequently, an electronic key 2 storing the SEED code is never shipped out of the factory.

Next, the manufacturing operation of the electronic key 2 that is additionally registered to the immobilizer ECU 6 after vehicle shipment will be described. As shown in FIG. 5, in the component factory, the vehicle ID (VID-A) of the vehicle 1, in which the immobilizer ECU 6 is installed, and the encryption key (K-2) corresponding to the vehicle ID (V-ID) for additional registration are extracted from the database 9 when an order is placed and stored in the memory 42 of the additionally registered electronic key 2. The additionally registered electronic key 2 is manufactured to correspond to the immobilizer ECU 6. This allows the additionally registered electronic key 2 to perform ID verification with the immobilizer ECU 6 without a special registration operation. The additionally registered electronic key 2 is manufactured and shipped without the SEED code stored in the memory 42.

Next, the manufacturing operation of a replacement immobilizer ECU 6 will be described. As shown in FIG. 6, in the component factory, the vehicle ID (VID-A)) of the vehicle 1, in which the immobilizer ECU 6 for replacement is installed, and the encryption key (K-2) corresponding to the vehicle ID (V-ID) are extracted from the database 9 when an order is placed and stored in the memory 67 of the replacement immobilizer ECU 6. The replacement immobilizer ECU 6 is manufactured in conformance with the immobilizer ECU 6 used prior to replacement. This allows the replacement immobilizer ECU 6 to perform ID verification with the electronic key 2 without a special registration operation. The electronic key 2 of the embodiment is one example of a portable device. The electronic key registration system 7 of the embodiment is one example of a portable device registration system.

The present embodiment has the advantages described below.

(1) When an instruction is received from the registration-deletion tool 8, the immobilizer ECU 6 transmits the deletion request signal to request for deletion of the SEED code from the electronic key 2. When the deletion request signal is received, the electronic key 2 deletes the SEED code from the memory 42 of the electronic key 2. As a result, an electronic key 2 storing the SEED code is never shipped out of the factory. For ID verification between the electronic key 2 and the immobilizer ECU 6, an encryption key shared by the two is required. However, it is difficult to obtain the SEED code, which is used for generating the encryption key, from the electronic key 2. Thus, it is difficult to manufacture an unauthentic duplicate of the electronic key 2 that corresponds to the shipped immobilizer ECU 6.

(2) The registration-deletion tool 8 is also a tool used to register the electronic key 2 to the immobilizer ECU 6. That is, there is no need to use separate tools for registration of the electronic key 2 to the immobilizer ECU 6 and deletion of the SEED code from the electronic key 2. This allows for a decrease in the number of components of the electronic key registration system 7.

(3) The encryption key that is registered to the immobilizer ECU 6 is saved in the database 9 in association with the vehicle ID. Then, the vehicle ID and the associated encryption key, which are saved in the database 9, are stored in the memory of the additionally registered electronic key 2 and the memory of the replacement immobilizer ECU 6. This allows for ID verification between the immobilizer ECU 6 and the electronic key 2 without a special registration operation.

(4) The additionally registered electronic key 2 is manufactured without the SEED code stored in the memory. That is, the additionally registered electronic key 2 does not include the SEED code when shipped out from the factory. Thus, it is difficult to manufacture an unauthentic duplicate of the electronic key 2 that corresponds to the shipped immobilizer ECU 6.

(5) The SEED code is deleted from the memory 42 of the electronic key 2, for example, in a final inspection process of the vehicle 1. In this case, the SEED code is not deleted until the final inspection process of the vehicle 1. Accordingly, when registration cannot be performed in a preferred manner between the electronic key 2 and the immobilizer ECU 6, the electronic key 2 may be registered to another immobilizer ECU.

The above embodiment may be modified as follows.

In the above embodiment, the registration-deletion tool 8 includes a function to register the electronic key 2 to the immobilizer ECU 6 and a function to delete the SEED code from the electronic key 2. Instead, there may be two tools, each of which independently includes a discrete function.

For example, the registration-deletion tool 8 may be a deletion tool that is specialized in deletion of the SEED code from the electronic key 2.

In the above embodiment, the immobilizer ECU 6 may delete the key generation logic f after a registration operation. For example, when a deletion signal is received from the registration-deletion tool 8, the immobilizer ECU 6 deletes the key generation logic f, which is stored in the memory 67. This prevents registration of a different electronic key to the immobilizer ECU 6. Also, this prevents the leakage of the key generation logic f to a third party. As long as the use of the key generation logic f is prohibited after the registration operation, registration of a different electronic key to the immobilizer ECU 6 may be prevented without deleting the key generation logic f.

In the above embodiment, after the registration operation, the SEED code (SC-1), which serves as information related to the encryption code (K-1) registered to the immobilizer ECU 6, is saved in the database 9. Instead, the encryption code (K-1) may be saved as the information in the database 9. In this manner, computations using the key generation logic f may be skipped when the encryption key K from the database 9 is stored in the replacement immobilizer ECU 6.

In the above embodiment, the present invention is applied to the immobilizer system 3, in which the electronic key 2 is inserted into the key cylinder. Instead, the present invention may be applied to an electronic key system that allows for communication when the electronic key 2 enters a communication area generated by the vehicle 1.

In the above embodiment, the present invention is applied to the immobilizer system 3, in which the electronic key 2 transmits a signal through wireless communication when activated by a driving radio wave received from the vehicle. Instead, the present invention may be applied to a so-called wireless system, which transmits a wireless signal toward the vehicle when a switch on the electronic key 2 is operated.

In the above embodiment, the registration-deletion tool 8 may be any one of a portable type, a personal computer type, a large device, and the like. The registration-deletion tool 8 may be a specialized tool for registration, a specialized tool for deletion, and a tool for another inspection. When used for another inspection, the deletion signal may be a "vehicle assembly completion instruction" from the registration-deletion tool. The electronic key 2 deletes the SEED code when receiving the vehicle assembly completion instruction. For example, the vehicle assembly completion instruction is transmitted from the registration-deletion tool to the vehicle after all inspections are completed.

In the above embodiment, the deletion of the SEED code is performed in the final inspection process of the entire vehicle but is not necessarily limited to the final inspection process. For example, the SEED code may be deleted in a non-final vehicle inspection.

The modified examples may be combined, preferred examples may be combined, and modified examples and preferred examples may be combined.

The invention claimed is:

1. A portable device registration system comprising:
a portable device that uses a first encryption key to perform encrypted communication with a vehicle which uses a second encryption key that corresponds to the first encryption key of the portable device; and
a controller included in the vehicle, wherein the portable device registration system registers the portable device to the controller;
wherein the controller stores identification information unique to the vehicle and a key generation logic configured to generate the second encryption key of the vehicle;
the portable device stores an encryption key generation code unique to the portable device and the first encryption key of the portable device;
the controller performs a registration process including
writing the identification information to the portable device through wireless communication with the portable device,
retrieving a copy of the encryption key generation code from the portable device through wireless communication with the portable device,
generating the second encryption key of the vehicle that is the same as that of the first encryption key of the portable device using the retrieved copy of the encryption key generation code and the key generation logic stored in the controller, and
storing the generated second encryption key of the vehicle in the controller;
the portable device registration system includes a deletion tool instructing the controller to transmit a deletion request signal to the portable device to delete the encryption key generation code from the portable device; and
the controller transmits the deletion request signal to the portable device after receiving an instruction from the deletion tool, and the portable device deletes the encryption key generation code from the portable device when receiving the deletion request signal so that the identification information of the vehicle and the first encryption key of the portable device remain in the portable device.

2. The portable device registration system according to claim 1, wherein the deletion tool transmits a registration instruction to instruct starting of the registration process, and the controller performs the registration process when receiving the registration instruction.

3. The portable device registration system according to claim 1, further comprising a database that saves the identification information, which is stored in the controller prior to shipment, in association with a registration encryption key or the encryption key generation code, and
a supplemental portable device and a supplemental controller that store a copy of the identification information, which is saved in the database, and a third encryption key, which is generated from a copy of the registration encryption key or a copy of the encryption key generation code read from the database.

4. The portable device registration system according to claim 1, wherein the controller deletes the key generation logic from the controller after the second encryption key of the vehicle is generated.

5. The portable device registration system according to claim 1, wherein the encryption key generation code is deleted from the portable device in a final inspection of the vehicle.

6. The portable device registration system according to claim 1, wherein the portable device includes a portable device memory that stores the encryption key generation code only during a period from when the portable device is manufactured to when the portable device is shipped out from a factory.

7. The portable device registration system according to claim 6, wherein the controller does not include the second encryption key of the vehicle prior to registration of the portable device but includes the second encryption key of the vehicle after registration of the portable device.

8. The portable device registration system according to claim 1, wherein
the portable device is pre-stored with the first encryption key of the portable device but not a registration encryption key before registration of the portable device to the controller, and
the controller is pre-stored with the registration encryption key but not the second encryption key of the vehicle before registration of the controller to the portable device.

9. A portable device registration method for registering a portable device to a controller installed in a vehicle, wherein the portable device uses a first encryption key to perform encrypted communication with the vehicle which uses a second encryption key that corresponds to the first encryption key of the portable device, the portable device registration method comprising:

storing identification information unique to the vehicle and a key generation logic used to generate the second encryption key of the vehicle in the controller;

storing, in the portable device, an encryption key generation code unique to the portable device and the second encryption key of the vehicle;

performing a registration process after the controller is installed in the vehicle, in which the controller
writes the identification information to the portable device through wireless communication with the portable device,
retrieves a copy of the encryption key generation code from the portable device through wireless communication with the portable device,
generates the second encryption key of the vehicle that is the same as that of the first encryption key of the portable device using the retrieved copy of the encryption key generation code and the key generation logic stored in the controller, and
stores the generated second encryption key of the vehicle in the controller;

instructing the controller to transmit a deletion request signal to the portable device to delete the encryption key generation code from the portable device during an inspection conducted on the vehicle after the controller stores the second encryption key of the vehicle;

transmitting the deletion request signal to the portable device from the controller upon receipt of the instruction; and deleting the encryption key generation code from the portable device when the portable device receives the deletion request signal so that the identification information of the vehicle and the first encryption key of the portable device remain in the portable device.

* * * * *